June 13, 1944.  P. E. CARTER  2,351,104
COMBINED PUSH RAKE AND STACKER
Filed June 11, 1943  5 Sheets-Sheet 3
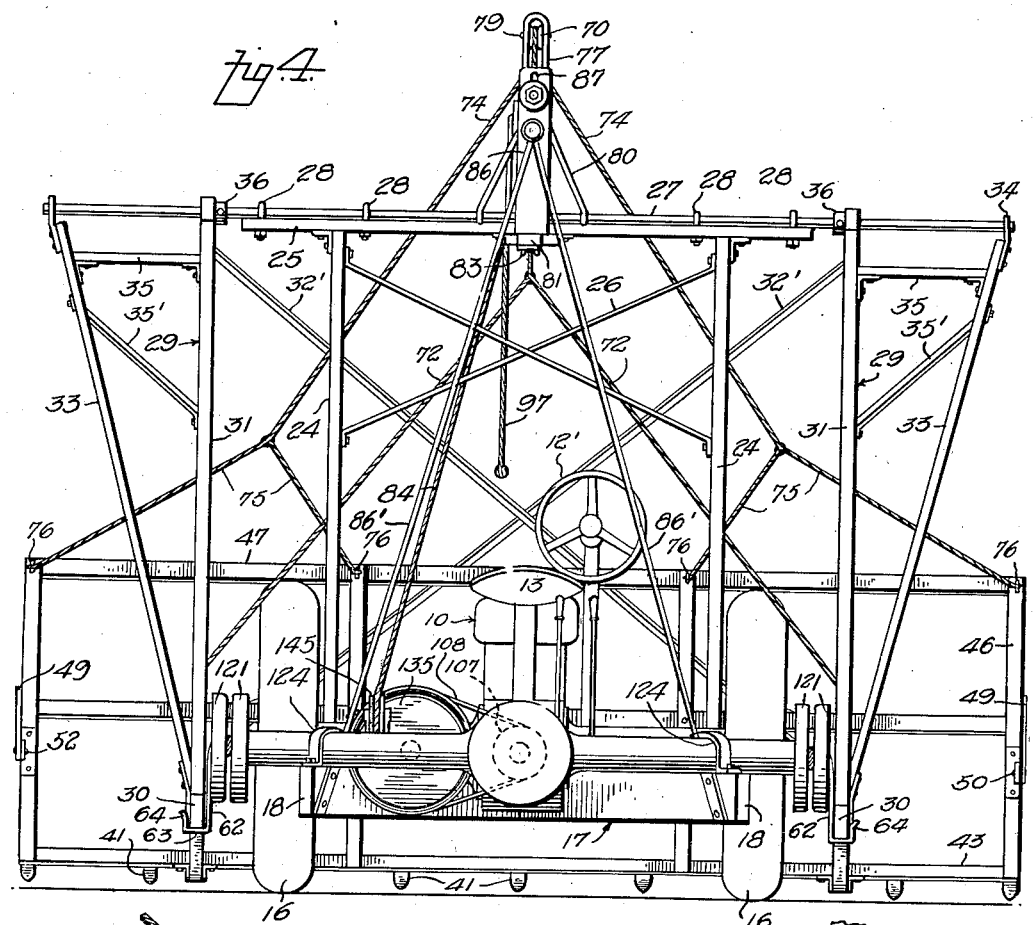
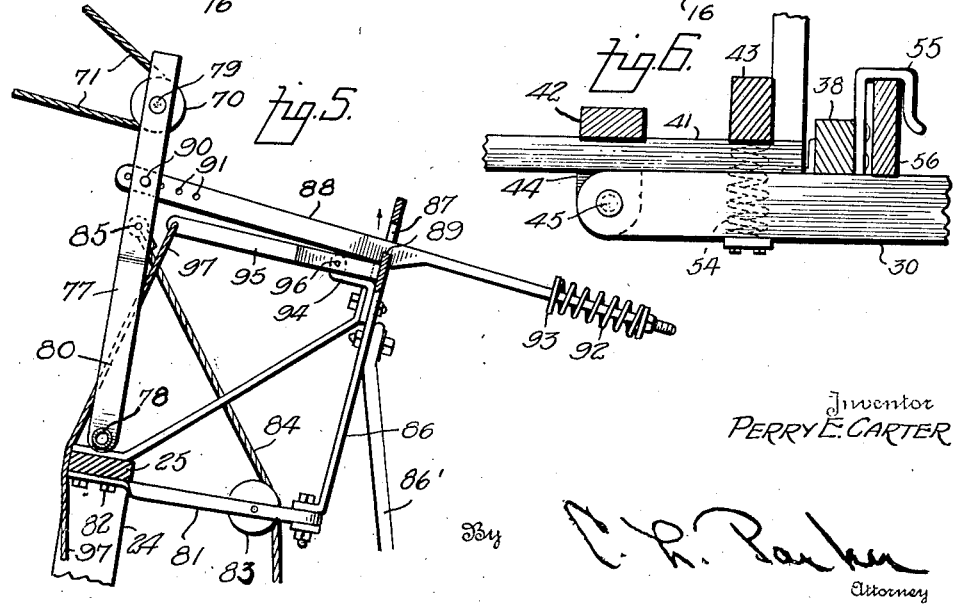
Inventor
PERRY E. CARTER

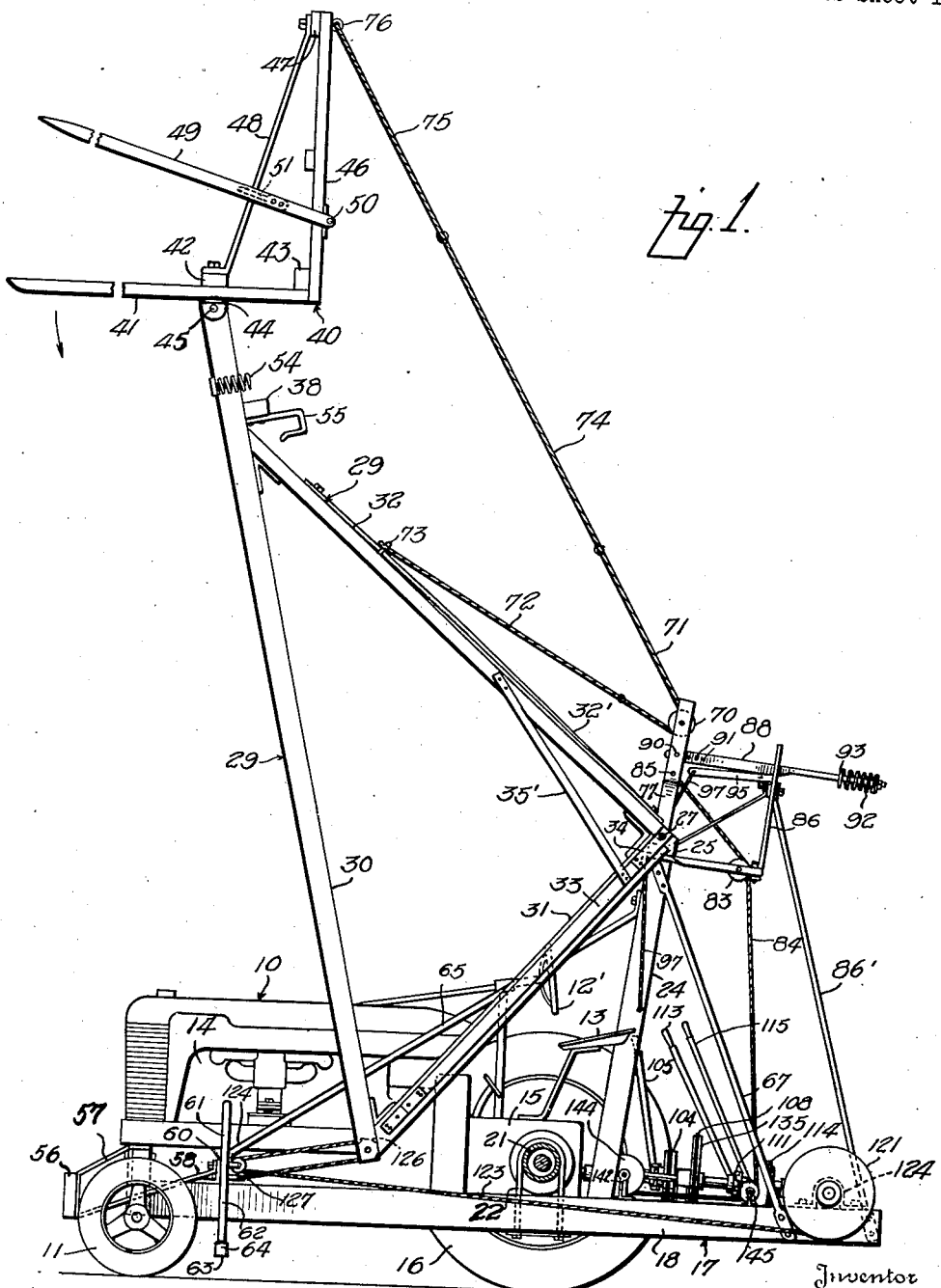

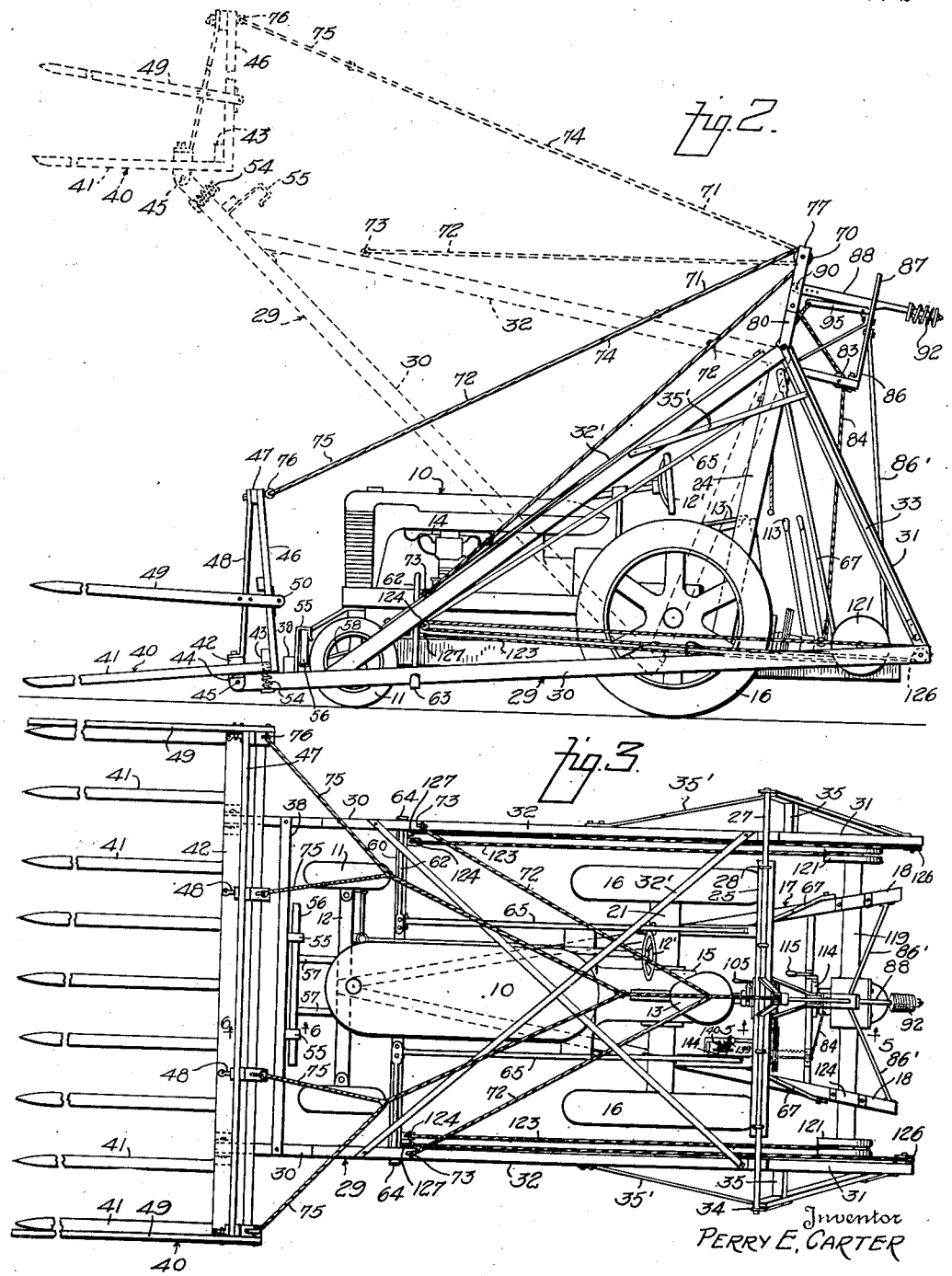

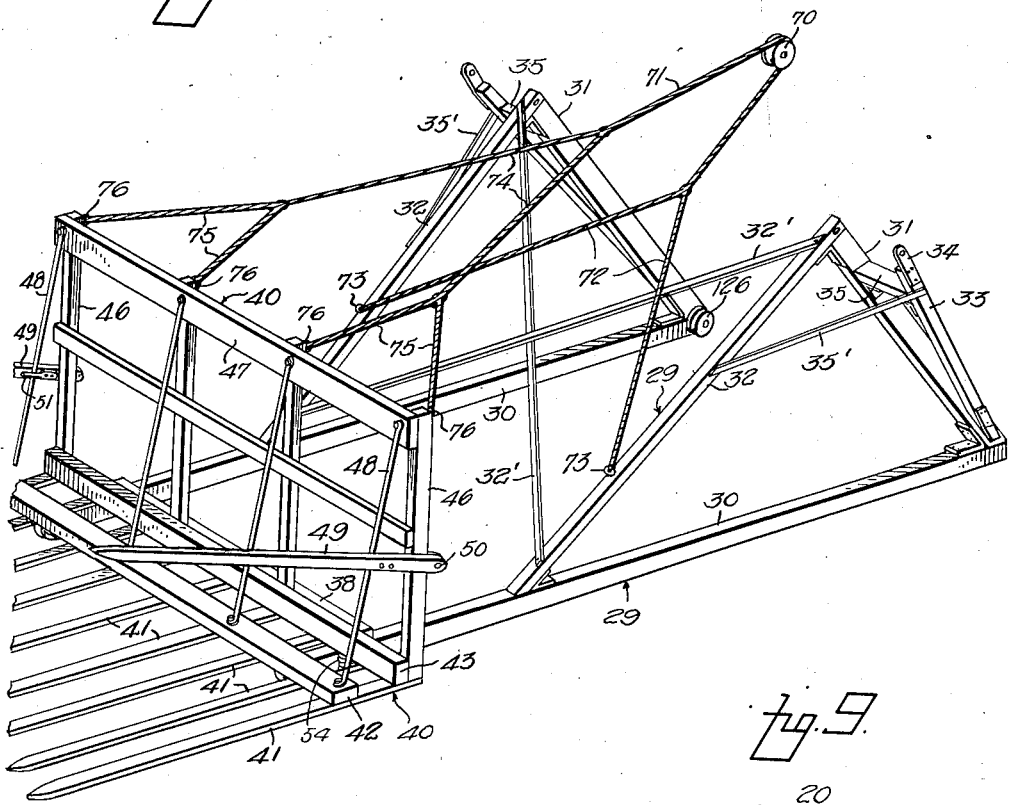
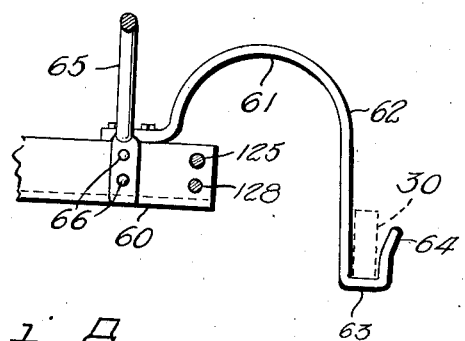

June 13, 1944.  P. E. CARTER  2,351,104
COMBINED PUSH RAKE AND STACKER
Filed June 11, 1943  5 Sheets-Sheet 5
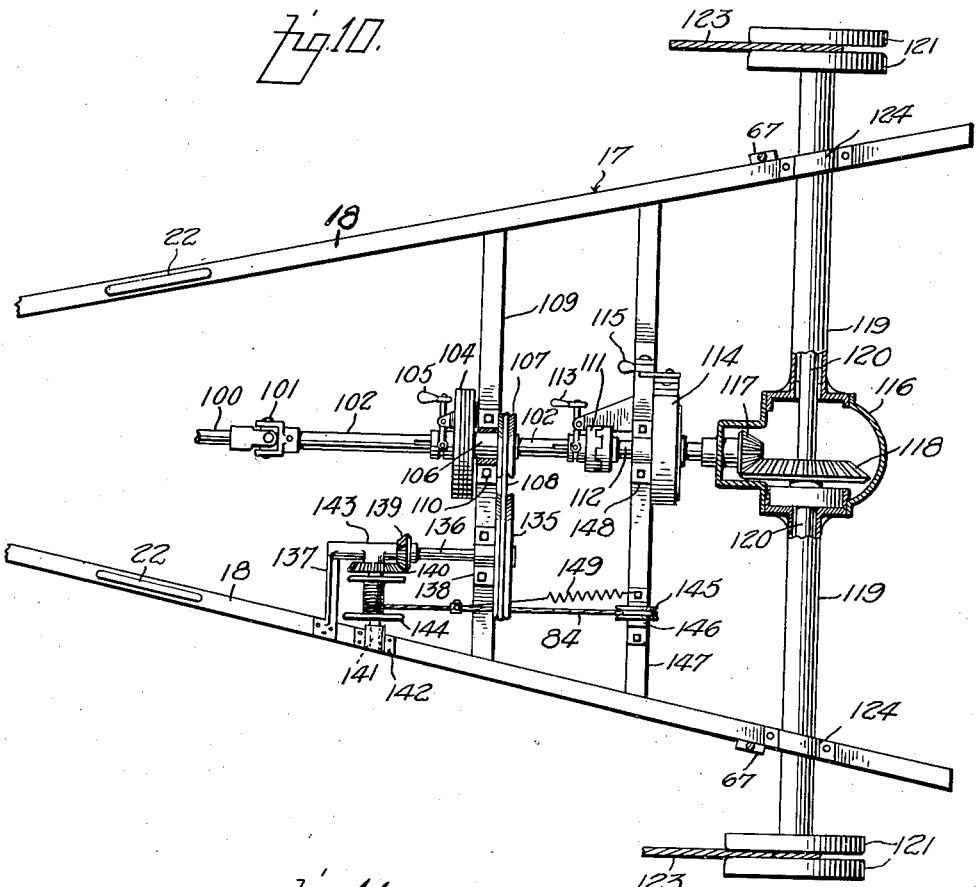
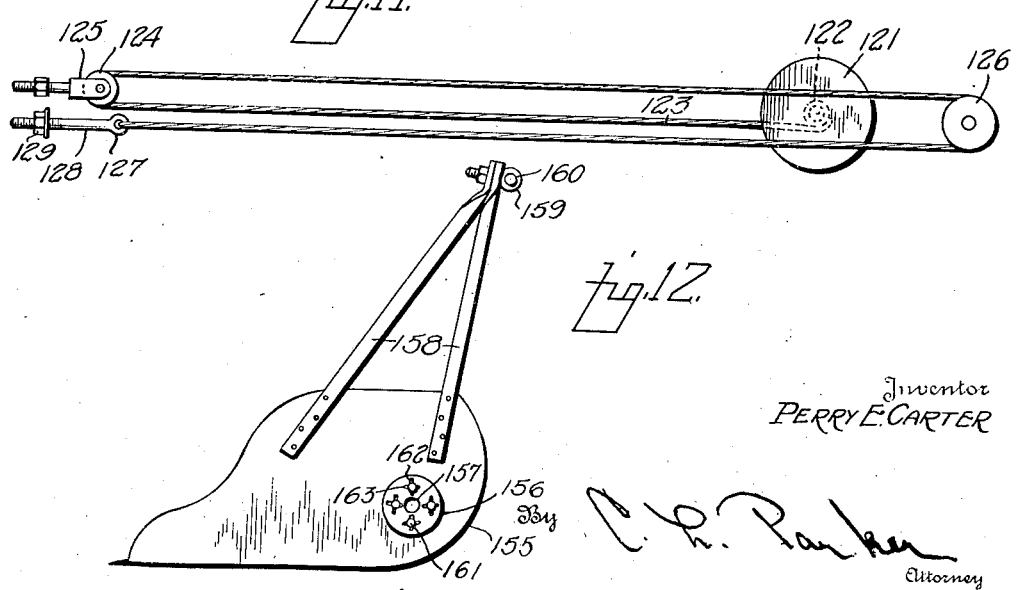
Inventor
PERRY E. CARTER Patented June 13, 1944

2,351,104

UNITED STATES PATENT OFFICE 2,351,104

COMBINED PUSH RAKE AND STACKER

Perry E. Carter, Guilford, Mo.

Application June 11, 1943, Serial No. 490,507

16 Claims. (Cl. 214—140)

This invention relates to a combined push rake and stacker, and particularly to an apparatus adapted for use in conjunction with a conventional farm tractor for gathering and stacking hay.

An important object of the invention is to provide novel means for gathering hay on a rake structure and to elevate the rake structure to a desired dumping position while maintaining the rake in a normal position until it is desired to dump the hay or other material thereon.

A further object is to provide such an apparatus wherein the rake comprises substantially horizontal tines and a vertical back structure rigidly connected thereto, and to provide automatic means for maintaining such portions of the rake structure in normal position until it is desired to dump the material therefrom.

A further object is to provide novel easily operable means for dumping the material from the rake structure and for returning the elements of the rake structure to normal position to reset such structure.

A further object is to provide novel elevating means for the rake structure whereby the material on the rake may be raised to a substantial elevation and dumped forwardly of the tractor which carries the apparatus.

A further object is to provide novel power transmission means for operating the rake elevating means.

A further object is to provide such an apparatus wherein a simple form of cable mechanism is employed for operating the elevating means and wherein such operation is effected by the transmission of a substantially straight line pull at such positions with respect to the driver of the tractor as to protect him from any possible injury in the event one of the cables should break.

A further object is to provide such a power transmission means wherein the power ratio progressively increases as the inertia of the rod is overcome during the elevating operation.

A further object is to provide a novel form of supporting frame structure connected to the tractor at three points to eliminate any weaving or distortion of the apparatus.

Other objects and advantages of the invention will become apparent during the course of the following description.

In the drawings I have shown one embodiment of the invention. In this showing—

Figure 1 is a side elevation of the apparatus showing one of the tractor wheels removed, with the rake structure shown in elevated position, Figure 2 is a side elevation on a somewhat reduced scale, of the tractor showing the invention applied, the rake structure being shown in its normal raking position and being shown in dotted lines in an intermediate position, Figure 3 is a plan view of the apparatus, Figure 4 is a rear elevation on a somewhat enlarged scale, Figure 5 is an enlarged fragmentary vertical sectional view on line 5—5 of Figure 3, showing the brake releasing and latching mechanism, Figure 6 is a detailed sectional view on line 6—6 of Figure 3, Figure 7 is a schematic perspective view showing the arrangement of the means for holding the rake structure in horizontal position, Figure 8 is a fragmentary rear elevation of one end of an anchor member and associated elements, Figure 9 is a fragmentary side elevation showing the forward end of the main frame and the hanger means for supporting it, Figure 10 is a fragmentary plan view showing the main frame of the apparatus detached from the tractor and illustrating the power transmitting means, parts being shown in section, Figure 11 is a side elevation of the cable mechanism for operating the rake elevating mechanism, shown detached from the apparatus, and Figure 12 is a side elevation of a scoop which may be used in conjunction with the apparatus instead of the rake structure.

Referring to Figures 1 to 4 inclusive the numeral 10 designates a conventional farm tractor having relatively small front wheels 11 carried by an axle structure 12. This axle structure is conventionally connected to the tractor beneath the forward end thereof to swing on a horizontal axis longitudinally of the tractor to permit relatively free vertical movement of the wheels 11 over uneven ground without transmitting twisting strains to the tractor. Such connecting means for the axle is conventional, as stated, and need not be described in detail, but further reference will be made later to the pivot means in conjunction with the main frame of the present apparatus. The wheels 11 are adapted to be turned by the usual steering wheel 12' arranged adjacent the driver's seat 13.

The tractor comprises the usual power plant 14 including a conventional clutch, transmission and differential unit 15 by means of which power is delivered to the relatively large rear wheels 16 of the tractor.

The structure forming the subject matter of the present invention comprises a main supporting frame 17 formed of a pair of side frame members 18 arranged in V form with the apex thereof at the forward end of the tractor. The frame 17, as will become apparent, supports the entire weight of the apparatus and the load being gathered and elevated thereby, and is preferably connected to the tractor beneath the body thereof. The frame 17 is preferably connected to the tractor at three points and in such a manner as to eliminate the transmission of any twisting strains to the frame. As shown in Figure 9 the forward end of the frame 17 is provided with a hanger 19 bolted or otherwise secured thereto as at 20' and projecting upwardly above the frame. The upper end of the hanger 19 is preferably connected to the pivot bolt 20 by means of which the axle 12 of the tractor is mounted to turn on a horizontal axis as previously stated. Therefore the pivot bolt 20 supports the weight of the forward end of the frame 17.

The members 18 of the frame may be formed of any suitable material, and in practice it is preferred that they be formed of suitable 2" x 12" timber. The rear end portions of the frame members 18 may be supported with respect to the tractor in any suitable manner. For example, the wheels 16 of the tractor have their axles mounted in housings 21 and the frame members 18 may be provided with relatively heavy straps 22 secured thereto at their ends and embracing the respective housings 21. Accordingly the frame 17 will be supported at three points with respect to the tractor.

A relatively heavy standard 24 has its lower end secured to each of the frame members 18. The upper ends of these standards are provided with a relatively heavy cross piece 25 (Figures 4 and 5) and the standards 24 and cross member 25 also may be made of relatively heavy timbers. The standards 24 may be suitably braced as at 26. A load supporting member 27 extends over and parallel to the cross member 25 and is secured thereto by suitable clamps 28. The member 27 may be conveniently made of a section of rigid steel pipe. This pipe supports the elevating frame work in a manner to be described.

The elevating frame work comprises a pair of triangular units each of which is indicated as a whole by the numeral 29. Each of the units 29 comprises a normally lower frame member 30 extending from a point forwardly of the tractor to a point rearwardly thereof. At the rear end of each frame member 30 is arranged an upwardly and forwardly extending angular frame member 31 and to the upper end of the frame member is connected a tension frame member 32. The latter member slopes downwardly and forwardly and has its lower end connected to the associated frame member 30. The frame members 32 are suitably braced to each other as at 32' and each frame member 32 has its upper end secured against the upper end of the frame member 31 at a point above the pipe 27, and the pipe extends through a suitable opening in each frame member 31 to thereby act as a pivotal support for each elevating frame 29.

The frame members 30 and 31 at opposite sides of the apparatus are preferably suitably braced to prevent lateral swinging movement of the frames 29. For this purpose, a brace 33 has its lower end connected to each frame member 31 adjacent the lower end thereof and arranged approximately in the plane of the member 31. Each brace 33 diverges upwardly from the associated member 31 and has an upper member 34 surrounding the pipe 27. The upper end of each brace 33 may be fixed with respect to the corresponding end of the member 31 by a cross member 35 and is preferably connected to the associated frame member 32 as at 35'. Any suitable means may be provided for positively preventing movement of the frame 29 longitudinally of the pipe 27. For example, this pipe may be provided with a collar 36 engaging the inner face of each frame member 31. It will be apparent that the structure just described comprises a pair of generally triangular frame structures with the base element projecting forwardly beyond the front of the tractor. These frame structures turn about the axis of the pipe 27 for a purpose to be described, and just forwardly of the wheels 11 the frame members 30 are connected to each other by a relatively heavy cross member 38 (Figure 3). This cross member positively prevents movement of the forward ends of the frame members 30 toward and away from each other.

The forward ends of the frame members 30 support a rake structure indicated as a whole by the numeral 40. The rake structure comprises a plurality of tines 41 connected at a point spaced from their rear ends by a cross member 42 and at their rear ends by a cross member 43. Bracket elements 44 are connected to the cross member 42 whereby the rake structure may be pivotally connected to frame members 30 as at 45. A back 46 forms a part of the rake structure and is connected at its bottom end to the cross member 43. A transverse cross member 47 extends across the top of the back 46 and side braces 48 are connected between the cross members 42 and 47.

Where hay is to be handled by the rake structure, it is desirable to provide means for preventing the loss of hay from the ends of the rake structure. For this purpose, a retaining arm 49 may be arranged at each side of the rake structure and pivotally connected to the back thereof as at 50. Each arm 49 preferably carries a clamp 51 whereby each arm may be clamped to one of the braces 48 in any adjusted position.

When the parts of the apparatus are in their normal positions as shown in solid lines in Figure 2, the elevating frame 29 supports the rake structure 40 in the proper position to enable the tines 41 to move over the ground to gather hay or any other material. The rake structure is pivoted to the frame members 29 at the point 45, as previously stated. In order to enable the tines 41 to swing upwardly beyond their normal positions when passing over uneven ground, the frame members 30 are provided with springs 54 engaging the rake structure rearwardly of the pivot 45. The means for holding the rear end of the rake structure in engagement with the springs 45 against turning movement in the opposite direction will be referred to later.

In order to support the weight of the forward end of the elevating frame structure and the rake and its contents, the cross member 38 (Figure 6) is provided with a pair of relatively rigid hooks 55 extending over a broad flat bumper 56. This bumper may be supported at the forward end of the tractor by suitable hanger irons 57 and is suitably braced to the frame or any other suitable portion of the tractor as at 58. This bumper, of course, performs its intended function as a bumper when the load is elevated as in Figure 1.

An anchor member 60 (Figures 2, 3 and 8) extends transversely of the tractor beneath the forward portion of the frame thereof and is rigidly secured to the frame 17. Each end of the anchor member 60 carries a saddle member 61 having a depending relatively straight portion 62 adapted to lie inwardly of and adjacent one of the frame members 30. The saddle is provided at its lower end with a hook 63 the free end 64 of which preferably curves outwardly slightly, as shown in Figure 10. The hooks 63 at the ends of the anchor 60 engage beneath the respective frame members 30 to assist the bumper 56 in sustaining the load imposed by the elevating frame.

At opposite sides of the tractor the forward ends of brace members 65 are secured as at 66 to the anchor 60. These brace members are inclined upwardly and rearwardly and are fixed at their rear ends to the respective standards 24. These standards are also held in position by rear braces 67 secured at their upper ends to the standards and at their rear ends to the main frame members 18 (Figures 1 and 7).

From the foregoing it will be apparent that the elevating frame structure swings about the axis of the pipe or shaft 27 to elevate the load, and means to be described later is employed for effecting such elevating operation. Automatic means is provided for maintaining the tines 41 of the rake structure substantially horizontal during swinging movement of the frame structure 29, and for releasing the rake structure to dump the load, when desired. For this purpose a pulley 70 is supported in the manner to be described and a cable or other flexible element 71 passes around this pulley. The lower portion of the cable 71 has its end connected to forwardly diverging cables 72 connected as at 73 to the respective frame members 32. The top portion of the cable 71 has its end connected to a pair of forwardly diverging cables 74, and each of these cables, in turn, has its forward end connected to a pair of diverging short cable sections 75. Each of the cables 75 is connected as at 76 to the top portion of the back 46 of the rake structure. The axis of the pulley 70 is arranged a calculated distance above the axis of the pipe or shaft 27. It will be apparent that if the rake structure 40 moved bodily with the frame structure 29 as the latter is elevated, the tines 41 would progressively assume increasingly angular positions, as is true of the frame elements 30. The action of the cable elements referred to, however, is such that as the elevating action progresses, the distances between the cable connections 73 and the pulley 70 progressively decrease, thus permitting the cable 71 to feed around the pulley 70 to provide for a progressively increasing distance between the pulley 70 and the top of the back of the rake structure. This operation permits the rake structure to progressively turn in a counterclockwise direction about its pivot connections 45 relative to the frame structure 29. With the proper arrangement and proportion of the parts, the rake structure, while changing its position relative to the frame 29, will continue to move with the tines 41 remaining approximately horizontal. This permits a load of loose material, such as hay, to be elevated without losing any of the material from the rake structure.

The mechanism for controlling the position of the pulley 70 is shown in Figures 1, 4 and 5. An elongated inverted U-shaped arm 77 is supported at its lower end as at 78 on the pipe member 27. The pulley 70 is rotatably supported by a bolt 79 passing through the arms of the member 70 adjacent the upper end thereof. The lower ends of the arms of the member 77 diverge as at 80 (Figure 4) to brace the member 77 against movement transversely of the forces delivered to the pulley 70 by the cables 71 and 72 in the event there is any slight uneven loading of the branch cables 72, 74 or 75.

A substantially U-shaped bracket 81 has its free ends twisted and secured as at 82 against the bottom of the cross member 25. A pulley 83 is journalled in the bracket 81, and a cable 84 passes around this pulley and is connected at 85 to the arm 77. The lower end of the cable 84 is adapted to be pulled in a manner to be described.

An arm 86 is secured at its lower end to the bracket 81 and is braced to the frame members 18 as at 86'. The arm 86 is provided near its upper end with a vertically elongated slot 87. A bar 88 extends through the slot 87 and is notched as at 89 to engage the bottom of the notch 87 to normally hold the bar in the position shown in Figure 5. A pin 90 pivotally connects the bar 88 to the arm 77, and the pin 90 extends selectively through either of a plurality of openings 91 in the bar 88. This means provides an adjustment for the position of the pulley 70 when the notch 89 is in the normal position referred to. The arm 77 and pulley 70 aer released by lifting the free end of the arm 88, in a manner to be described, and a spring 92 is arranged on the bar 88 with a washer 93 at one end thereof to engage the arm 86 when the notch 89 is released, thus providing a cushion for movement of the arm 77 when it is released.

A bracket 94 is secured to the arm 88 and a lever 95 is pivoted as at 96 to the bracket 94. One end of this lever is arranged beneath the bar 88 and the other end is connected to the upper end of a flexible element 97. The lower end of this flexible element is arranged adjacent the driver's seat on the tractor to be pulled by the driver to swing the lever 95 and raise the bar 88 to release the notch 89. This operation dumps the load on the rake structure, as will become apparent.

The mechanism for raising and lowering the frame 29 and rake structure is shown in Figures 1, 10 and 11. A power take-off shaft 100 is arranged to be driven in any suitable manner by the motor 14. For example, the shaft 100 may be connected to the conventional transmission counter shaft so as to be driven at all times when the main clutch of the tractor is in engagement, regardless of the position of the transmission gear shift. The shaft 100 is connected by a universal joint 101 to a driven shaft 102. This shaft carries a clutch 104 having one element driven by the shaft and movable by a handle 105. The other element of the clutch is integrally connected by a sleeve 106 with a pulley 107 about which passes a belt 108 for a purpose to be described. A cross member 109 is connected to the frame members 18 and carries a bearing 110 surrounding the sleeve 106 and supporting the shafts 102 and 103 and associated elements.

A clutch 111 is adapted to deliver power from the rear end of the shaft 102 to another shaft 112, one element of the clutch being driven by the shaft 102 and movable by a handle 113. The shaft 112 is provided with a brake 114 which may be conventional in construction and operable by a handle 115. The shaft 112 extends into a housing 116 and carries a pinion 117 within such housing meshing with a bevel gear 118. Tubular extensions 119 are carried by the housing 116 and a shaft 120 extends through the extensions 119 and carries the gear 118.

The raising and lowering mechanism for the frame members 29 is driven by the shaft 120. Each end of this shaft carries a pair of discs 121 connected by a sleeve 122 serving as a drum about which one end of a cable 123 is wound, the extremity of the cable being connected to the sleeve 122 in any suitable manner. The space between the discs 121 of each pair approximates the thickness of the cable whereby successive convolutions of the cable will be wound one upon another for a reason to be described. The cable winding means may be arranged at any suitable place on the apparatus and preferably is arranged adjacent the rear extremity and supported on the frame members 18. Suitable clamps 124 anchor the tubular extensions 119. The frame 18 being stationary, it will be apparent that the discs 121 rotate on a fixed axis to wind the cable 123 thereon and thus transmit a pull to the cable.

Each cable 123 extends forwardly from the associated discs or drums 121 and passes around a pulley 124 (Figures 1, 2 and 11) carried by a hanger 125 connected to the anchor bar 60. From the pulley 125 each cable 123 extends rearwardly past the associated discs 121 outwardly thereof, and then turns about a pulley 126 carried by the associated frame member 30 adjacent the rear end thereof. From the pulley 126, the associated cable 123 extends forwardly for connection with an eye 127 carried by an adjusting bolt 128 extending through the anchor 60 and having an adjusting nut 129 thereon. It will be obvious that each cable is connected at one end to one of the winding drums 121 and at its other end to one of the eyes 127, and the adjusting nuts of these eyes provide for the proper tensioning of the cable 123. Rotation of the discs or drums 121 winds the cables 123 to exert a pull thereon and thus move the pulley 126 forwardly to swing the frame 29 about the axis of the pipe or shaft 27.

The belt 108 passes around a pulley 135 mounted on a shaft 136 journalled in bearings 137 and 138, the former being mounted as a bracket on the adjacent frame member 18, and the bearing 138 being mounted on the cross member 109. The shaft 136 carries a bevel pinion 139 meshing with a bevel gear 140 mounted on a shaft 141 journalled at one end in a bearing 142 mounted on the adjacent frame member 18. The other end of the shaft 141 may be mounted in an extended portion 143 of the bearing 137.

The shaft 141 carries a spool 144 about which is wound the end of the cable 84 referred to above. This cable passes around a pulley 145 journalled in the bearing 146 carried by a cross frame member 147. This frame member also carries a bearing 148 for the shaft 112 and also preferably supports the handle mechanism for operating the brake 114. A return spring 149 is connected to the cross member 147 and to the cable 84 at a point remote from the cross member 147 to tend to pull the cable 84 in the direction necessary for the release of the arm 87 when the load on the rake structure is to be dumped in a manner to be described.

Gathering devices other than the rake structure may be employed with the apparatus, for example, in Figure 12 of the drawings I have shown a scoop which may be mounted in the apparatus in place of the rake structure. Referring to Figure 12 the numeral 155 designates a conventional scoop and the sides of this member are provided with plates 156 having recesses 157 to receive the pivots 45. The scoop is provided with upwardly converging arms 158 connected to each end thereof and the upper ends of these arms carry eyes 159 in which may be mounted a bar 160 to which the cables 75 (Figure 7) may be connected. Accordingly it will be apparent that the scoop may be directly substituted for the rake structure without making any changes in the apparatus. If desired, the plates 156 may be secured to the ends of the scoop by screws 161 passing through slots 162 and 163 whereby the scoop may be adjusted upwardly and downwardly or forwardly and rearwardly to adapt the scoop for different uses.

The operation of the apparatus is as follows:

The parts of the apparatus occupy the positions shown in solid lines in Figure 2, the elevating structure being supported by engagement of the side rails 30 with the saddles 61 and with the hooks 55 (Figure 6) engaging the bumper 56 to assist in supporting the load. With the parts in normal positions, the tractor may be driven forwardly over the ground to gather hay or to collect any other material. The forward ends of the tines 41 travel over the ground and have the under sides of their extremities curved upwardly to facilitate sliding movement of the tines over the ground. If the tines pass over a slight elevation in the ground, the upward pressure against the bottom of the tines will swing the rake structure in a clockwise direction against the tension of the springs 54, thus permitting the tines to move over raised places on the ground. If the movement provided by the springs 54 is insufficient to take care of the necessary swinging movement of the rake structure, further upward pressure against the tines will elevate the forward end of the frame structure 29 to whatever extent is necessary. The straight portions 62 (Figure 8) of the saddles 61 act as guides for the elevating structure when passing over such uneven surfaces, as will be apparent.

After the rake structure has been loaded, the operator may elevate the load and drive the tractor to the unloading point. In order to elevate the rake structure, the operator will engage the clutch 111 (Figure 10) with the brake 114 released, and power will be delivered through the shaft 112 and pinion 117 to rotate the gear 118 and thus rotate the discs 121. This operation causes the cables 123 at opposite sides of the apparatus to be wound on the sleeve 122, and successive convolutions of the cable on the sleeve 122 will be wound one upon the other. This arrangement is advantageous since it provides for a relatively slow initial elevation of the load with a progressive increase in the speed ratio as the inertia of the load is progressively overcome. This permits the load to be readily elevated and at the same time minimizes the time required for such operation. The arrangement referred to is also advantageous since it eliminates conventional spooling of the cable with the accompanying disadvantage of having one turn of the cable slip off of a preceding turn, which would result in a sudden momentary slackening in one of the cables.

The winding of the cables 123 pulls these cables around the anchored pulleys 124 and transmits a pull to the pulleys 126 carried by the rear ends of the side frame members 30. The ends of the cables are anchored to the eyes 127. The cable and pulley arrangement referred to accordingly effects a forward pulling of the rear ends of the elevating frame structures to swing the elevating frame about the axis of the pipe or shaft 27. The arrangement shown is highly advantageous for several reasons. In the first place it provides a convenient speed reduction means to enable the power of the vehicle engine to easily elevate the load, and it provides an approximately straight line pull through which the power may be efficiently delivered. Moreover, it provides for the placing of the cables outwardly of the sides of the tractor with all portions of the cables substantially below the driver so that if a cable breaks, the driver will be protected against possible injury.

The arrangement of the pulley 70 (Figures 1, 2 and 5) above the axis of the pipe or shaft 27 and the passing of the cable 71 around such pulley provides efficient means for maintaining the tines 41 approximately level during the elevation of the load. The provision of the arms 49 prevents loss of the load from the ends of the rake structure, and this arrangement together with the holding of the tines 41 in horizontal position prevents any loss of the material from the rake structure during its elevation. As the elevating operation takes place the points 73 move progressively closer to the pulley 70 since they turn about the axis of the pipe 27. The shortening of this distance results in the progressive feeding of the cable 72 around the pulley 70 with a resultant lengthening of the distance between the pulley 70 and the connecting points 76, thus permitting the back of the rake to move toward the left relative to the elevating frame structure. Accordingly the rake structure progressively turns relative to the elevating frame structure but remains approximately in its normal position relative to the ground.

After the load has been elevated to the proper point, the operator will engage the brake 114 and disengage the clutch 111, thus disconnecting the source of power from the elevating mechanism and holding the load in elevated position. These operations may be conveniently carried out by slipping the main tractor clutch as the brake 114 is engaged, and thereafter releasing the clutch 111 and again engaging the engine clutch. The tractor will then be driven to the desired point for unloading the hay or other material.

When the tractor is in the proper discharging position, the operator will pull downwardly on the end of the cable 97 (Figures 4 and 5) thus swinging the lever 95 to lift the bar 98 and release the notch 89. The load on the rake structure will be exerting a constant pull against the pulley 70 and the operation referred to will release the pulley 70 and its arm 77 for swinging movement toward the left as viewed in Figures 1 and 5. The load on the rake structure will then turn the rake in a counter-clockwise direction to dump the load by gravity. The operator will then engage the clutch 104 and the pulley 107 will rotate to drive the pulley 135 and rotate the spool 144 to wind the cable 84 thereon. It will be recalled that the arm 77 (Figure 5) will have been released and this arm will occupy a position substantially to the left of the normal position with the washer 93 engaging the upper end portion of the arm 86. When the cable 84 is pulled in the manner stated, it will transmit a pull to the arm 77 to move it back to its normal position, which position will be reached when the notch 87 again engages the bottom of the slot 87. When this position is reached, the operator will immediately release the clutch 104. If the operator fails immediately to release this clutch, no damage will be done to the parts of the apparatus since the belt 108 will slip on the pulleys 107 and 135.

When the foregoing operation is completed the rake structure will be reset in its normal position with the pulley 70 latched in its proper normal position. The operator will then back the tractor away from the loading point, after which he will release the brake 114 (Figure 10) and the elevating structure and rake structure will return to their normal positions. Of course, these parts may be held in their elevated positions while the tractor is being driven back to the point where it is desired to again load the rake structure.

The use of the scoop shown in Figure 12 will be obvious. This scoop may be readily supported by the same pivot elements 45 which are normally employed for supporting the rake structure, and the cables 75 (Figure 7) may be connected to the bar 160 so that the scoop may be maintained level during elevation thereof, as is true of the rake structure. This scoop obviously may be dumped in the same manner as this operation is performed with the rake structure.

From the foregoing it will be apparent that the present mechanism provides a relatively simple apparatus for picking up, elevating and dumping various materials, the apparatus being particularly intended for picking up and stacking hay. The apparatus accommodates itself to uneven ground surfaces, and the power for elevating the structure is applied in a novel manner whereby the power is used efficiently and the operator is protected from possible injury if one of the elevating cables should break. The apparatus also provides novel means for holding the load in its normal position relative to the ground while being elevated, and also provides novel means for dumping the load when the discharge point is reached, and for resetting the mechanism. The apparatus is readily returnable to normal position by gravity upon the releasing of the brake 114. The controls for the apparatus are simple and are readily accessible to the operator. The saddles 61 (Figure 8) provide means for guiding the elevating structure when the latter moves vertically incident to passing over uneven ground. Moreover, the saddle structure possesses substantial resiliency to cushion the load of the elevating structure when the latter is lowered. The frame members 31 contact the saddle hooks just before the hooks 55 (Figure 6) engage the bumper 56, and thus afford resilient means to engage and cushion movement of the elevating structure as it approaches its lowermost position.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. Apparatus of the character described comprising a tractor, an elevating frame pivoted to said tractor to swing on a horizontal axis spaced a substantial distance above the ground, means for applying force substantially in a horizontal plane to said frame substantially below said pivot axis to swing the forward end of said frame upwardly, a gathering receptacle pivoted on a horizontal axis to the forward end of said frame, said receptacle having a normally substantially horizontal bottom, and means for retaining said bottom substantially horizontal during swinging movement of said frame, comprising a cable connected to said receptacle and to said frame forwardly of the pivotal connection thereof to the tractor, and a pulley arranged above said pivot axis and around which said cable passes.

2. Apparatus constructed in accordance with claim 1 provided with means for releasing said pulley to release said receptacle to dump material therefrom.

3. Apparatus constructed in accordance with claim 1 provided with an arm carrying said pulley, a latch device for holding said arm in a normal position, and means for releasing said latch device to release said receptacle for dumping movement.

4. Apparatus constructed in accordance with claim 1 provided with an arm carrying said pulley, a latch device for holding said arm in a normal position, means for releasing said latch device to release said receptacle for dumping movement, and means for effecting a pull on said arm to return it to normal position.

5. In combination with a tractor, an elevating frame, means mounted on the tractor for supporting said frame for turning movement on a horizontal axis a substantial distance above the ground adjacent the rear end of the tractor, said frame comprising elongated parallel side members normally substantially horizontally arranged, a material receptacle pivoted to the forward end portion of said frame to swing on a horizontal axis rearwardly of the center of gravity of said receptacle, said receptacle having a normally substantially horizontal bottom, means comprising a cable having mechanical connection with said frame forwardly of the turning axis thereof and with said receptacle above the pivot axis thereof, a pulley arranged above the pivot axis of said frame and around which said cable passes, means for swinging said frame about its pivot axis to elevate said receptacle, and means normally holding said pulley in a predetermined position and releasable to release said receptacle to dump by gravity.

6. Apparatus constructed in accordance with claim 5 wherein said last named means comprises an arm carrying said pulley, and a releasable latch device normally holding said arm in a predetermined position.

7. Apparatus constructed in accordance with claim 5 wherein said last named means comprises a pivoted supporting arm, a holding element, a latch connected to said arm and engaging said holding element to hold said arm in a predetermined position, and means for releasing said latch to release said arm whereby said receptacle will dump by gravity.

8. Apparatus constructed in accordance with claim 5 wherein said last named means comprises a pivoted supporting arm, a holding element, a latch connected to said arm and engaging said holding element to hold said arm in a predetermined position, and means for releasing said latch to release said arm whereby said receptacle will dump by gravity, and means for returning said arm to latching position.

9. In combination with a tractor, an elevating frame, means carried by the tractor for supporting said frame for turning movement about a horizontal axis a substantial distance above the ground toward the rear end of said frame, a material receptacle carried by the forward end of said frame, and means for swinging said frame to elevate said receptacle, such means comprising an anchor bar carried by said tractor adjacent the forward end thereof, and a pulley and cable arrangement at each side of the tractor, each such arrangement comprising a cable having one end anchored to said anchor bar, a pulley carried by the corresponding side of said frame adjacent the bottom and rear end thereof and around which said cable passes, and a cable spool upon which the other end of each cable is wound to transmit a forward pulling force through the corresponding cable to each side of said frame to swing the latter about its pivot axis, each spool having a narrow cable-receiving groove whereby successive turns of each cable will be wound one upon another.

10. In combination with a tractor, an elevating frame, means carried by the tractor for supporting said frame for turning movement about a horizontal axis a substantial distance above the ground and toward the rear end of said frame, a material receptacle carried by the forward end of said frame, means for swinging said frame to elevate said receptacle, said frame comprising elongated normally substantially horizontal side members, and saddles supported by the tractor and engaging said side members to limit their downward movement, said saddles having vertically elongated portions to limit transverse movement of said side members when the latter are at or adjacent their normal positions.

11. Apparatus constructed in accordance with claim 10 wherein said saddles depend from the tractor and are resilient to cushion downward movement of said side members.

12. In combination with a tractor, an elevating frame, means carried by the tractor for supporting said frame for turning movement about a horizontal axis a substantial distance above the ground and toward the rear end of said frame, a material receptacle carried by the forward end of said frame, means for swinging said frame to elevate said receptacle, said receptacle being pivoted to said frame to turn on a horizontal axis rearwardly of the center of gravity of said receptacle, a pulley normally occupying a predetermined position above the turning axis of said frame, means comprising a cable passing around said pulley and having mechanical connection with said frame forwardly of the turning axis thereof and with said receptacle above the pivot axis thereof, and means for releasing said pulley to release said receptacle for dumping movement.

13. In combination with a tractor, an elevating frame, means carried by the tractor for supporting said frame for turning movement about a horizontal axis a substantial distance above the ground and toward the rear end of said frame, a material receptacle carried by the forward end of said frame, means for swinging said frame to elevate said receptacle, said receptacle being pivoted to said frame to turn on a horizontal axis rearwardly of the center of gravity of said receptacle, a pulley normally occupying a predetermined position above the turning axis of said frame, means comprising a cable passing around said pulley and having mechanical connection with said frame forwardly of the turning axis thereof and with said receptacle above the pivot axis thereof, an arm carrying said pulley, latch means normally holding said arm in a position to hold said pulley in said predetermined position, and means for releasing said latch means to release said arm for swinging movement whereby said receptacle will dump by gravity.

14. In combination with a tractor, an elevating frame, means carried by the tractor for supporting said frame for turning movement about a horizontal axis a substantial distance above the ground and toward the rear end of said frame, a material receptacle carried by the forward end of said frame, means for swinging said frame to elevate said receptacle, said receptacle being pivoted to said frame to turn on a horizontal axis rearwardly of the center of gravity of said receptacle, a pulley normally occupying a predetermined position above the turning axis of said frame, means comprising a cable passing around said pulley and having mechanical connection with said frame forwardly of the turning axis thereof and with said receptacle above the pivot axis thereof, an arm carrying said pulley, latch means normally holding said arm in a position to hold said pulley in said predetermined position, means for releasing said latch means to release said arm for swinging movement whereby said receptacle will dump by gravity, and means for moving said arm back to latching position.

15. In combination with a tractor, a supporting structure arranged beneath the tractor and secured thereto, upstanding supporting means carried by said supporting structure, a frame pivoted to said supporting means a substantial distance above the ground, a material receptacle carried by the forward end of said frame, and means for swinging said frame to elevate said receptacle.

16. In combination with a tractor, a supporting structure arranged beneath the tractor, single-point means for securing said structure to said tractor adjacent its forward end, means for securing said supporting structure to said tractor at transversely spaced points adjacent the rear end of said tractor, upstanding supporting means carried by said supporting structure adjacent the rear end thereof, an elevating frame pivotally connected to said supporting means to turn on a horizontal axis a substantial distance above the ground, a material receptacle carried by the forward end of said frame, and means for swinging said frame to elevate said receptacle.

PERRY E. CARTER.